I. B. SMITH.
MUSIC ROLL HOLDER.
APPLICATION FILED NOV. 8, 1905.
1,008,440.
Patented Nov. 14, 1911.
5 SHEETS—SHEET 2.
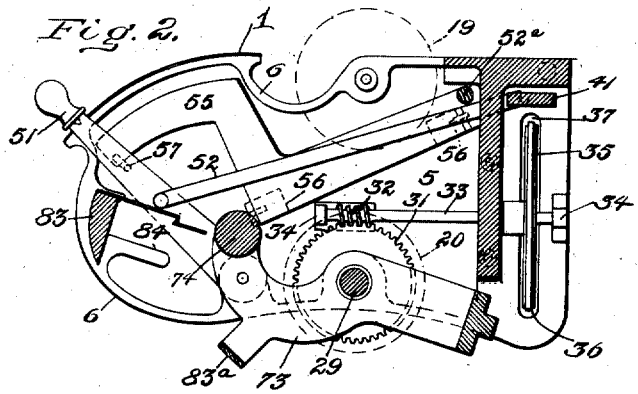
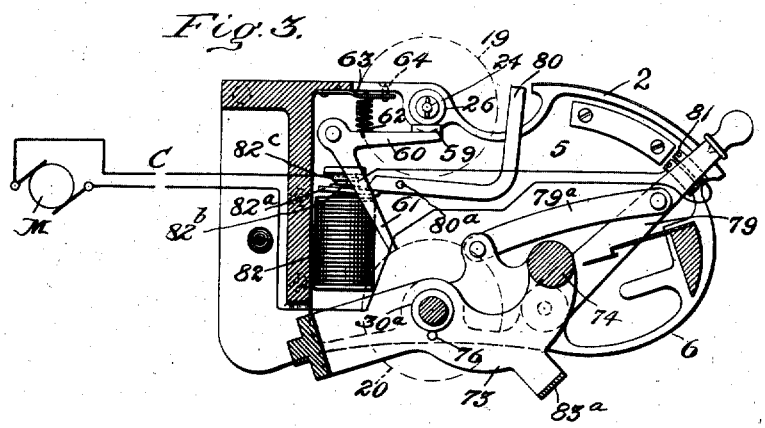
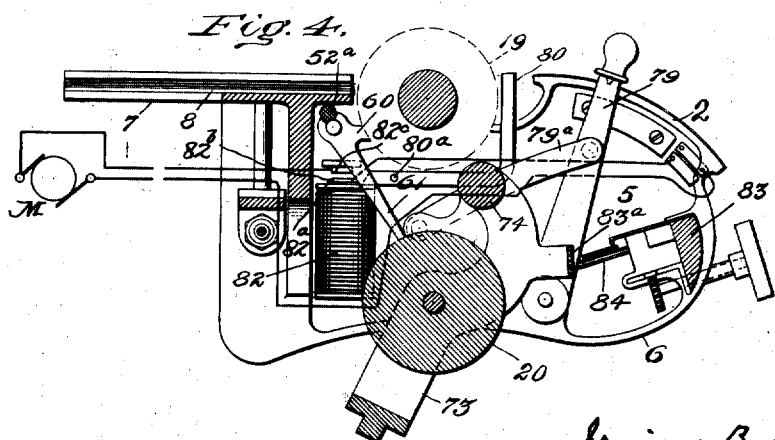

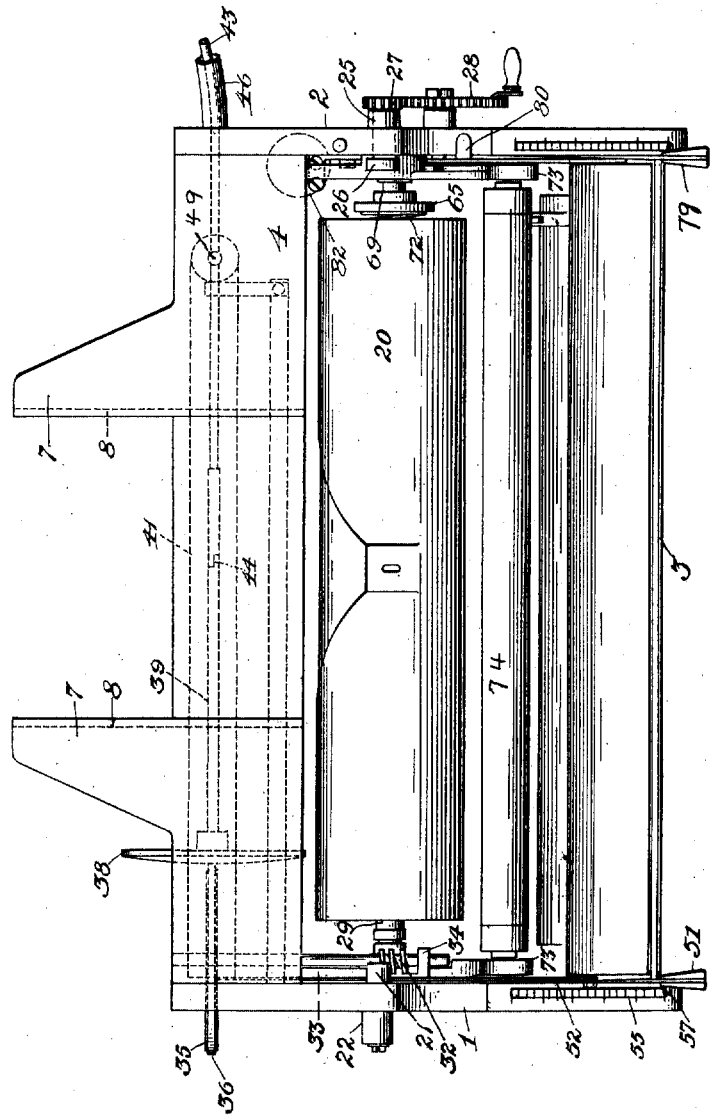

I. B. SMITH.
MUSIC ROLL HOLDER.
APPLICATION FILED NOV. 8, 1905.
1,008,440.
Patented Nov. 14, 1911.
5 SHEETS—SHEET 3.
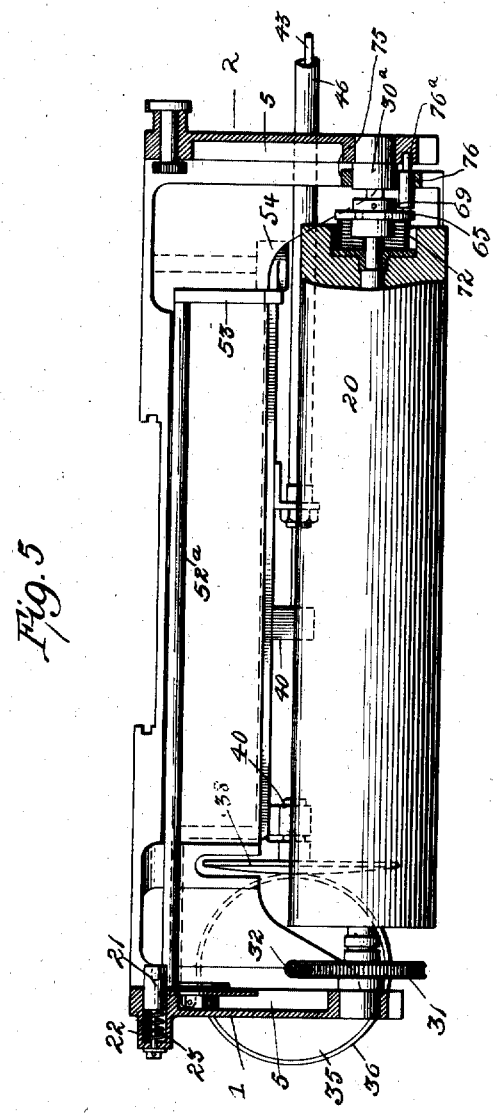
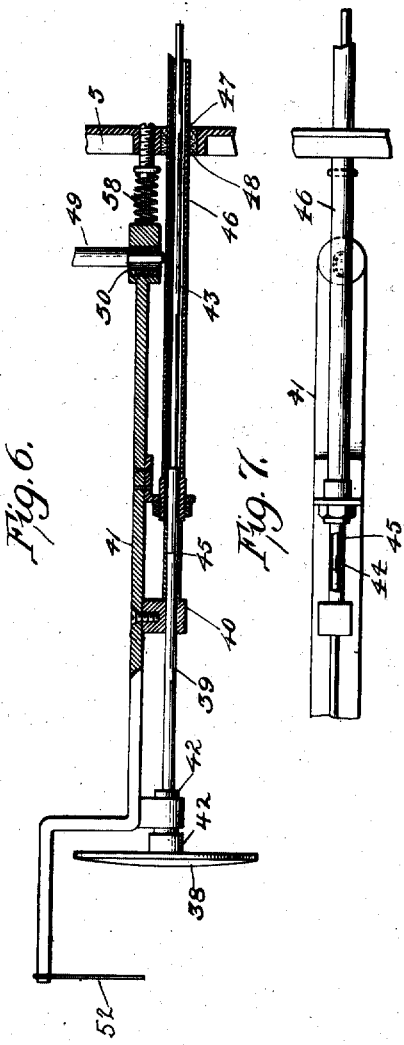
Witnesses
Gertrude M. Stricker
M.C.D. Waters
Inventor
Irving B. Smith
By Meyers, Cushman & Rea
Attorneys I. B. SMITH.
MUSIC ROLL HOLDER.
APPLICATION FILED NOV. 8, 1905.
1,008,440.
Patented Nov. 14, 1911.
5 SHEETS—SHEET 4.
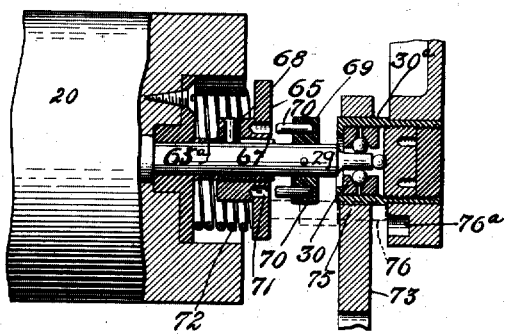
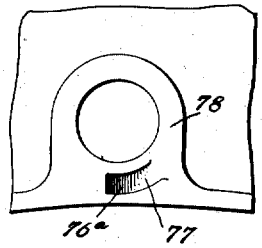
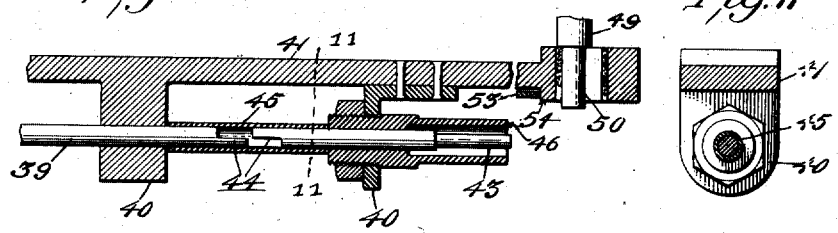
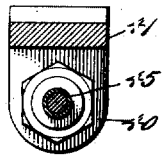
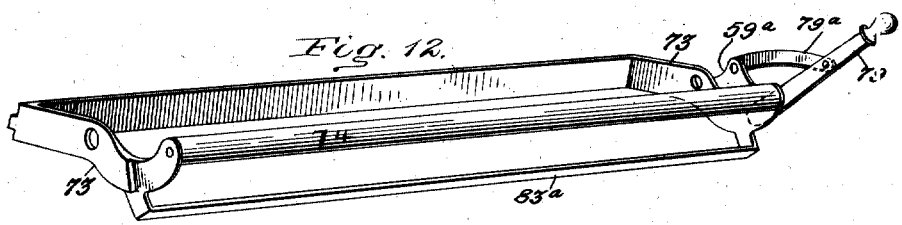
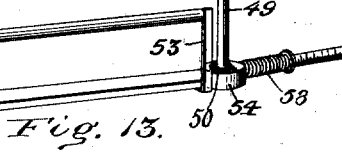

I. B. SMITH.
MUSIC ROLL HOLDER.
APPLICATION FILED NOV. 8, 1905.
1,008,440.
Patented Nov. 14, 1911.
5 SHEETS—SHEET 5.
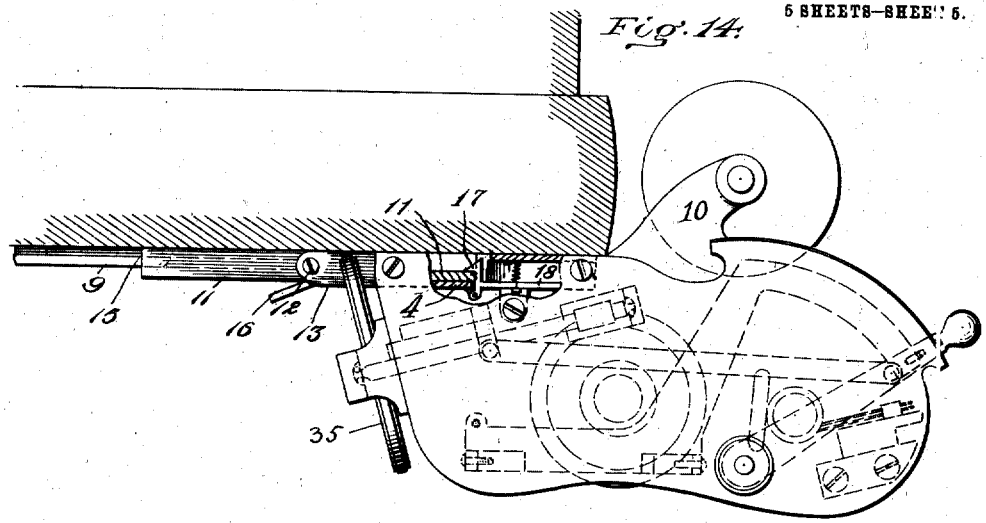
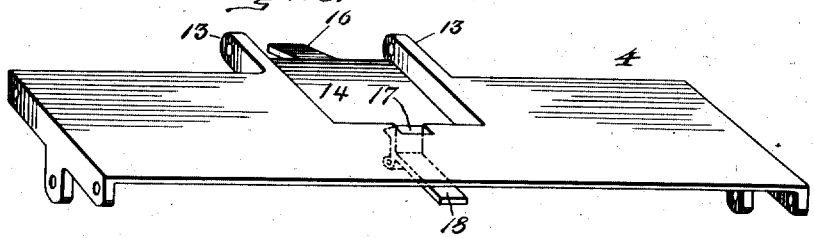
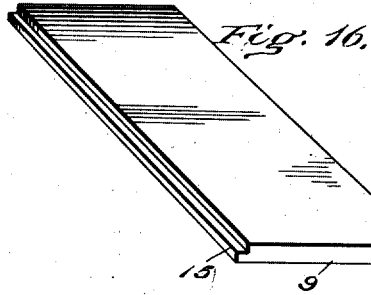
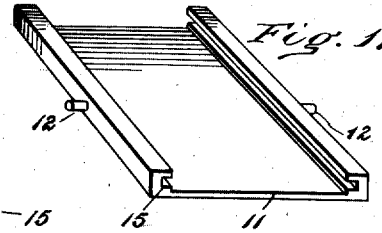
Witnesses
Gertrude M. Strucker
M. C. D'Walters
Inventor
Irving B. Smith
by Meyers, Cushman & Rea
Attorneys

UNITED STATES PATENT OFFICE.

IRVING B. SMITH, OF PHILADELPHIA, PENNSYLVANIA, ASSIGNOR, BY MESNE ASSIGNMENTS, TO ELECTRELLE COMPANY, OF PHILADELPHIA, PENNSYLVANIA, A CORPORATION OF PENNSYLVANIA.

MUSIC-ROLL HOLDER.

1,008,440.  Specification of Letters Patent.  Patented Nov. 14, 1911.

Application filed November 8, 1905. Serial No. 286,412.

*To all whom it may concern:*

Be it known that I, IRVING B. SMITH, a citizen of the United States, residing at Philadelphia, in the county of Philadelphia and State of Pennsylvania, have invented new and useful Improvements in Music-Roll Holders, of which the following is a specification.

This invention relates to improvements in music roll holders for automatic musical instrument players, particularly adapted to support the music roll and take-up roll in coöperative relation to the roll actuating means and correlated mechanism.

The invention has for its object to provide a music roll holder capable of the operations hereinafter set forth, and combining means for controlling and regulating the operation of the music roll and take-up roll and the devices for rotating the latter, so associated that complete control of the instrumentalities is had by the use of a minimum of operating levers.

The invention resides in a roll holder possessing the features, elements and combination of elements hereinafter set forth.

That which is regarded as new will be set forth in the accompanying clauses of claim.

In the drawings which illustrate the best known embodiment of my invention—Figure 1, is a top plan view, the music roller being removed. Fig. 2, is a vertical section near one of the end members of the frame illustrating the means for driving the take-up roll and means for controlling or varying the action of such driving means. Fig. 3, is a similar view near the other end of the frame illustrating the contact roll cradle, the means for shifting the same to move it into active or inactive position, and the music roll brake. Fig. 4, is a view similar to Fig. 3, showing the brake and contact-finger guard. Fig. 5, a detail front elevation of the take-up roll and associated parts. Fig. 6, a view partly in elevation and partly in section, showing parts of the take-up roll driving mechanism. Fig. 7, a bottom plan view of some of the parts shown in Fig. 6. Fig. 8, a sectional view of one end of the take-up roll, its shaft and clutch. Fig. 9, a detail of the clutch operating mechanism. Fig. 10, a detail sectional view showing the connection between the friction-disk shaft, and the flexible motor or driving shaft. Fig. 11, a view on the line 11—11 of Fig. 10. Fig. 12, a perspective of the contact roll cradle. Fig. 13, a perspective view of the means for controlling and varying the action of the take-up roll driving mechanism. Fig. 14, a side view of roll-holder frame adapted to be moved in under the piano key base and withdrawn therefrom, and also, when withdrawn, to be elevated for operation and lowered to enable it to be moved beneath the piano key base. Fig. 15, a perspective view of the rear bar of the frame shown in Fig. 14. Fig. 16, a perspective view of the roll holder support located beneath the piano key base. Fig. 17, a perspective of the connecting element by which the roll holder frame may have a sliding and pivotal connection with said support.

In the said drawings the reference numerals 1 and 2 designate the end members of the roll-holder frame, and 3 and 4 the front and rear bars thereof. The end members are preferably hollowed out as shown to provide chambers 5, in which elements of the actuating mechanism are disposed, and to decrease the weight of the roll-holder frame. Said members are provided with marginal webs 6 of the original thickness of the material of which they are constructed, to afford desired rigidity and strength; and bosses in which various elements of the mechanism have bearing are preferably formed integral with the side members and of the original thickness of the material thereof.

Having particular reference to Fig. 1 of the drawing in which is illustrated one manner and means of connecting the roll-holder frame to a musical instrument, for instance, a piano, so that said frame, and the elements carried thereby, may be shifted in beneath and housed under the piano key-base; the bar 4 is provided with guides 7 having channels or ways 8 adapted to engage a support and guide-rail 9, (Fig. 16) connected under the piano key-base frame and upon which support the roll-holder may be moved in beneath the piano-key base when not in use, and moved out into operative position.

In Fig. 14 of the drawing, wherein the music roll is supported in arms 10 projecting upwardly from the roll-holder frame, said frame is mounted not only that it may be moved beneath the key-base, but is also capable of being swung in a direction at an angle to its in-and-out sliding movement for the purpose of bringing the music roll, (the operative position of which with relation to the key-base is illustrated in said Fig. 14 of the drawing), below the piano key-base preparatory to and to enable the roll holder mechanism to be shifted in under said key-base, and when moved out for operation, to be swung up into the operative position shown. This is accomplished in the illustrated and preferred embodiment shown in the drawing Figs. 14 to 17, by pivotally connecting the rear bar 4 to a slide 11, provided with pivot pins 12 journaled in ears 13 on the bar 4, the forward portion of the slide resting flush in a seat 14 in said bar. The slide is movably connected to a support 9 (hereinbefore referred to) secured to the instrument casing beneath the key-base, by a tongue and groove connection 15. The tilting or swinging movement of the music roll holder is limited by a stop 16 with which the bar 4 is provided in a position to come into contact with the slide when the roll-holder is swung downward, thus limiting the degree of such motion. The roll-holder is maintained in operative playing position by means of a catch 17, associated therewith, the nose of which locks over upon the slide, as best shown in Fig. 15. The catch is a pivoted one and has a finger piece 18 within reach of the operator whereby it may be released, the roll-holder swung upon its hinge or pivotal connection with the slide, and, together with said slide, be pushed in under the key-base of the instrument, out of the way when not in use. In use, the roll holder may be lifted from its lower position to that shown in Fig. 14, and acting upon the cam nose of the catch 17 pushes the latter out of the way after which the catch aided by its spring assumes the position illustrated in Fig. 14 and holds the roll holder in the position shown in said figure.

As illustrated in Figs. 2 to 4, the music-roll or spool 19, on which the perforated music sheet is wound, and on which it is incorporated into the holder, is arranged above the take-up roll 20.

The interrelation of the music and take-up rolls one above the other, as shown and described, is of material advantage, in that the music sheet is caused to travel from one roll to the other with its face substantially across the line of view of the operator sitting at the front of the instrument, who will be enabled naturally and easily to see and read tempo and expression indicia with which such sheets are usually provided, as the sheet passes from one to the other roll.

The swinging capacity of the roll-holder enables the rolls to be disposed high in the holder, the music-feed roll standing in front of the key-base of the piano as in Fig. 14. This brings the music sheet up high into the line of vision of the operator, and allows ample room for the knees of the operator sitting in front of the instrument.

The bearing at one end of the music-roll consists of a spring plug 21 arranged in a barrel 22, in which, behind the plug is arranged the spring 23. This arrangement facilitates the ready insertion and removal of the music roll from the holder. The opposite end of the music roll is provided with a female recess (not shown), to engage a correspondingly shaped wing 24 (Fig. 3) in a shaft 25 rotatably mounted in the adjacent end member of the frame, and, as best shown in Fig. 1, this shaft is provided with a brake hub or collar 26, to coöperate with brake mechanism as hereinafter described, and with a multiplying gear 27, in mesh with a hand rotatable gear 28, by which instrumentalities the music-roll may be rapidly rotated to rewind the music sheet thereon.

Take-up roll 20 is arranged loose upon a driven shaft 29 situated below the music-roll to the end that it may, during the rewind of the music-sheet, rotate upon and independently of said shaft. This shaft, as shown in Fig. 8, rotates in a ball bearing 30 which may be of any suitable, known type. Through the medium of the shaft the take-up roll is associated with friction driving mechanism, and also with means by which it may be caused to rotate with said shaft or permitted to rotate independently thereof, as hereinafter described. As shown in Figs. 1 and 2 the driving mechanism consists of a worm wheel 31, rigidly connected to or formed with the shaft of the take-up roll in mesh with which is a worm 32 on a shaft 33, journaled in bearings 34 with which the side member of the holder is provided. This shaft carries a friction transmitter wheel 35 the tread of which may be faced with rubber as shown at 36. An opening or passage 37 in the side member of the frame is provided, in the particular embodiment of the invention illustrated, to accommodate the wheel 35. Coöperatively arranged in relation to the friction transmitter wheel is a driver 38 consisting of a disk angularly disposed with relation to said transmitter wheel, the face of which is designed to contact with the wheel tread, and impart rotation thereto. The relation of the driver and transmitter wheel may be adjusted to vary the speed of rotation of the latter from a minimum to a maximum. This purpose is accomplished as shown, by making the driver the adjustable element. The active surface of the driver 38 is struck on an arc having as its center the pin 49, and said arc is such that there will be an operative driving contact between the driver 38 and wheel 35 in all positions of adjustment of driver 38. The driver 38 is mounted upon a shaft 39 journaled in hangers 40 connected with the driver carrier 41, hereinafter set forth. Undue end play of the shaft 39 is prevented by thrust collars 42 arranged thereon at opposite sides of one of the hangers. The shaft 39 is driven by a flexible shaft 43 actuated from any suitable normally continuously running motor. The shaft coupling may be of any suitable type, that shown being of the nature of counter part interlocking or key portions 44 of the ends of the shafts, and an inclosing sleeve 45 to hold said portions in interlocked engagement. As shown the flexible shaft is arranged in a casing or sheath 46 of metal, rubber or other suitable tubing. The passage 47 through the side member of the frame for the flexible shaft and its casing may be provided with a vibration dissipater consisting, as shown, of a felt washer 48. The driver as described, is connected to and partakes of the movement of the carrier 41, which consists of an arm fulcrumed upon a fulcrum pin 49, which enters a fulcrum socket 50 in the carrier. The carrier together with the driver supported thereby, may be swung in an arc upon the fulcrum pin to present different portions of the surface of the driver against the friction transmitter wheel, to alter the speed of rotation of the latter. The relative position of the driver surface to the wheel is governed by a controller lever 51, with which it is connected by a link 52. As shown this lever is articulated in a bearing and is disposed close to one of the side members of the frame, and by manipulation thereof the speed of the take-up roll may be regulated accurately according to the tempo of the music being played. It is obvious that by adjusting the driver with its dead center in contact with the transmitter wheel, there will be no rotation of the latter, and the travel of the music sheet will cease.

Means are provided in connection with the driver and its carrier, whereby the former may be withdrawn from contact with the transmission wheel, to enable the performer to arrest the travel of the music sheet and prolong or sustain any desired note or group of notes according to his individual taste or conception of the composition being played. This is accomplished by shiftably mounting the driver carrier and connecting the tempo-lever 51 thereto. This tempo lever is not only capable of being swung about a pivot, but also has lateral movement, so that it may be moved to shift carrier 41 and withdraw the driver 38 altogether from engagement with the wheel 35. The lever 51 may be connected to a side member of the frame by ball or other articulated joint, or, as shown, it may be constructed of material capable of being flexed laterally; the carrier is permitted to be shifted with respect to its fulcrum pin by elongating the fulcrum slot as shown. A shifting rod 52$^a$ provided with a shoe 53 to engage the carrier, preferably by way of a hub 54 surrounding the fulcrum-pin-socket thereof, is connected to a rock arm 55 mounted in bearings 56 carried by one of the side members of the frame; and with the free end of this rock-arm the controller lever is adapted to be connected and disconnected. As shown the free end of the rock-arm is arc-shaped and the controller lever is provided with a hook 57, which when the controller lever is moved to the position shown in Fig. 13, engages the rock-arm. When it is desired to withdraw the driver from contact with the transmitter wheel the controller lever is swung to engage the rock arm and is then moved laterally, rocking said arm shifting the rod 52, and through it the driver carrier to withdraw the driver from contact with the transmitter wheel. The driver is normally held in contact with the transmitter wheel, and the elements of the throw-out mechanism described are restored to initial position, after operation, automatically, in the present instance by means of a spring 58 working against the carrier, as best shown in Fig. 6.

In the operation of the mechanism the music sheet is drawn from the music roll by the take-up roll, the former rotating under the impulse of the drawing action of the latter. To the end that the sheet shall be presented properly to the instrumentalities that coöperate with the note perforations thereof, said sheet should be under appropriate tension. To accomplish this, brake-mechanism is associated with the music roll, such mechanism being of a character to permit the music roll to give off the sheet as required, and yet prevent voluntary or over rotation of the roll by reason of momentum or otherwise. The brake-mechanism shown comprises a shoe 59, disposed to work against the brake-hub 26 on the bearing for one end of the music roll, which bearing is normally connected for rotation with said roll. The said shoe is carried by one arm 60 of a two-arm lever; the other arm 61 of which coöperates with mechanism to release the brake during the rewinding operation as hereinafter set forth. Associated with the shoe-carrier arm is a spring 62 which holds the shoe in engagement with the brake hub, and the pressure of which is regulable. As shown, said spring, for this purpose, is connected to a plate 63 with which is combined an adjusting screw 64 by manipulation of which the tension of the spring may be varied. The clutch by which the take-up roll 20 is connected to its shaft 29, is best shown in Fig. 8, and comprises a movable member 65 arranged on a hub 65ᵃ of the take-up roll. The hub has a key-seat 67, in which works a key 68. The key-seat is elongated as shown to permit movement of this member to interlock with the fixed member 69 of the clutch, with which, as shown, it is adapted to have a pin and socket connection. The fixed member of the clutch is connected to the shaft and is provided with pins 70 to engage the sockets 71 of the movable member. Normally the clutch elements are interlocked to drive the take-up roll, and as shown, are held in engagement by a spring 72, which, when free to act after release or separation of the clutch members, automatically establishes interlocking of said members.

Mechanism is combined with the clutch to automatically release the take-up roll from the shaft during rewind of the sheet onto the music-roll. This mechanism is associated with the contact-roll cradle 73 (shown detached in Fig. 12) so that when the contact roll 74, carried thereby, is withdrawn from operation the take-up roll is automatically released from its driving shaft and runs as an idler thereon. The cradle is journaled intermediate its ends and is capable of rocking about its journal for the purpose of withdrawing the contact roll from operative relation to the music sheet and contact fingers as hereinafter set forth. The cradle journal preferably consists of the casing or cage 30ᵃ of the ball bearing 30 for the end of the shaft as best shown in Fig. 8; and the hub 75 of the cradle is provided with a bolt 76 freely movable therein between the movable member of the clutch and the adjacent end member of the frame 2 in which is provided a bolt socket 76ᵃ coincident with and into which the end of the bolt is forced by the spring when the cradle is in playing position as illustrated in Fig. 5, enabling the clutch members to interlock. One wall of the socket is inclined and serves as a cam 77 to push the end of the bolt out of the socket when the cradle is rocked to take the contact roll out of operative position. As the bolt rides out of the socket it pushes the movable member of the clutch out of engagement with the fixed member, passes onto the face of the abutment 78 and holds the clutch released until again brought into alinement with the socket when it is shot into said socket, and the engagement of the clutch members is established by the spring 72. When the clutch is released the take-up roll may rotate upon and independently of its shaft, to permit the music sheet to be rapidly rewound on the music roll. In the act of throwing the contact roll out of operation, the brake shoe 59 is withdrawn from the brake-hub 26, by contact therewith of an arm 59ᵃ of the contact roll cradle, and the music roll is then free of restraint and will respond easily to the action of the rewind appliances hereinbefore set forth. The cradle is connected by means of a link 79ᵃ to an operating handle 79.

The driving motor, shown conventionally at M, Figs. 3 and 4, is in an electrical circuit C, and this circuit may be made or broken by the usual switch-lever 80, pivoted at 80ᵃ and connected to the armature 82ᵃ of an electromagnet 82. The armature 82ᵃ carries a contact 82ᵇ which may be a knife-contact adapted to engage a corresponding contact member 82ᶜ. The circuit C may be made or broken at this point by manipulation of lever 80. The circuit may also be broken by the handle 79 which may be made to bridge the contact-plates 81, as in Fig. 3, to make the circuit or to assume the position shown in Fig. 4 to break the circuit. It will be observed that when the parts are shifted to playing position as in Fig. 3, where the contact roll 74 is in position to coöperate with the contacts 84 the circuit is made as a consequence of the operation of the handle 79 to bring the parts into such playing position. When a sheet of music is to be introduced into the roll holder and to be played the parts are shifted to the position shown in Fig. 4 by manipulation of the handle 79 to facilitate passage of the music sheet between the contact roll 74 and contacts 84, and the shifting of the parts to this position results in breaking the circuit and cutting out the motor. The electro-magnet 82 is designed to be energized at the end of a piece of music in a known way by a special contact switch engages the roll 74 through a stop perforation at the end of the piece of music in a manner well known in the art, for example, as shown in the Letters Patent of G. H. Davis, No. 719,092, Jan. 27, 1903, and since this is not claimed by me I have not shown the magnet-circuit. When so energized the magnet acts upon its armature 82ᵃ and breaks the contact 82ᵇ, 82ᶜ and automatically breaks the motor circuit, cutting out the motor. Operation of the single-handle 79, it will be observed acts to withdraw the contact roll from operation, release the take-up roll from the driving mechanism, throw off the music-roll-brake, and cut the motor out.

Mounted on the front bar of the machine is a contact finger carrier 83 in which are disposed a series of contacts 84 consisting of flexible fingers inclined in the direction of travel of, and adapted to pass into the note perforations of, the music sheet to make contact with the contact roll 74 carried in the end of the cradle as best shown in Fig. 4, and close circuits through magnets to actuate the key-strikers, which mechanism is not shown herein as it constitutes no part of the present invention.

To thread a sheet of music paper from the music roll to the take-up roll the parts are shifted to the position shown in Fig. 4, bringing a guard 83ᵃ carried by the cradle 73 in front of the contact fingers, protecting them from possible injury during the operation.

It will be observed that the roll-holder of my invention supports and contains within itself all the elements concerned in the transmission of roll-driving power from the motor; that variation of speed of rotation, and stoppage of rotation of the take-up roll to enable a note or group of notes to be prolonged or sustained, may be effected by manipulation of a single hand lever 51; and that the contact-roll may be withdrawn from operation, the take-up roll may be unclutched from its shaft, the brake withdrawn from the music-roll, and the motor cut out of operation, by manipulation of another single lever 79.

Having thus described my invention, what I claim as new and desire to secure by Letters Patent is:—

1. In a roll holder for musical instrument players, the combination with a frame, a music roll and a take-up roll arranged for rotation therein, of means for rotating the take-up roll including transmitting elements adjustable to vary the speed of rotation of the take-up roll, one of said elements being shiftable to interrupt transmission of motion to the take-up roll, and a lever operatively connected to control the operation of the transmitting elements and to shift said shiftable element out of contact with the other in all positions of adjustment of said elements.

2. In a roll holder for musical instrument players, the combination with a frame, a music roll and a take-up roll arranged for rotation therein, of means for rotating the take-up roll including transmitting elements adjustable to vary the speed of rotation of the take-up roll, one of said elements being shiftable to interrupt transmission of motion to the take-up roll, and means operatively connected to control the operation of the transmitting elements and to shift said shiftable element out of contact with the other in all positions of adjustment of said elements.

3. In a roll holder for musical instrument players, a music roll and a take-up roll arranged for rotation therein, means for driving the take-up roll including friction power-transmitting elements, means for varying the action of said transmitting elements, and for disassociating said elements, a single lever and connections for controlling said means, independent means for disconnecting the take-up roll from the driving means, and an independent lever for actuating the same.

4. In a roll holder for musical instrument players, a music roll and a take-up roll arranged for rotation therein, means for driving the take-up roll, means for disconnecting the take-up roll from said driving means, coöperatively arranged elements to cause the instrument to speak, a perforated music sheet for making said coöperatively arranged elements operative, means for cutting the driving means into and out of operation, a motor, and a single lever connected to move said elements out of coöperative relation, to release the take-up roll from the driving means, and to cut out the motor.

5. In a roll holder for musical instrument players, a music roll and a take-up roll arranged for rotation therein, means, including power transmitting elements, for driving the take-up roll, means for regulating the action of said transmitting elements and for disengaging said elements to interrupt the rotation of the take-up roll, a single lever and connections for controlling said action-regulating and disengaging means, independent means for disconnecting the take-up roll from the driving mechanism, coöperatively arranged elements to cause the instrument to speak, and a single lever and intermediate connections for operating the disconnecting means.

6. In a music-roll holder, the combination of music and take-up rolls, supporting means for said rolls, and roll-driving mechanism including elements adjustable to vary the speed of the driving roll, one of said elements being also shiftable into and out of operative contact with the other in all positions of adjustment of said elements.

7. In a music roll holder, the combination of music and take-up rolls, supporting means for said rolls, roll-driving mechanism including elements adjustable to vary the speed of the driving roll, one of said elements being also shiftable into and out of operative contact with the other in all positions of adjustment of said elements, and a single lever and connections for adjusting the operative relation of said elements and for interrupting such operative relation.

8. In a music roll holder, the combination of music and take-up rolls, supporting means for said rolls, roll driving mechanism, transmitting elements normally automatically held in operative relation and adjustable in their operative relation to govern the speed of the driven roll, and one of said elements being shiftable with relation to the other to interrupt the operative engagement thereof.

9. In a music roll holder, the combination of music and take-up rolls, supporting means for said rolls, roll driving mechanism, transmitting elements normally automatically held in operative relation and adjustable in their operative relation to govern the speed of the driven roll, and one of said elements being shiftable with relation to the other to interrupt the operative engagement thereof, and a single lever and connections for controlling the operative relation between the driven elements and for interrupting said relation.

10. In a music roll holder, the combination of music and take-up rolls, supporting means for said rolls, driving mechanism including a friction transmitting wheel and a friction drive disk, one of which is adjustable with relation to the other to vary the speed of rotation and shiftable to interrupt transmission of motion in all positions of adjustment of said wheel and disk.

11. In a music roll holder, the combination of music and take-up rolls, supporting means for said rolls, roll driving mechanism including a friction transmitting wheel operatively connected to drive the take-up roll, an oscillatory and longitudinally shiftable carrier, a friction drive disk connected to and partaking of the movements of said carrier, and means for oscillating and shifting said carrier.

12. In a music roll holder, the combination of music and take-up rolls, supporting means for said rolls, roll driving mechanism including a friction transmitting wheel operatively connected to drive the take-up roll, an oscillatory and longitudinally shiftable carrier, a friction drive disk connected to and partaking of the movements of said carrier, and a single lever and connections for oscillating and shifting said carrier.

13. In a music roll holder, the combination of music and take-up rolls, supporting means for said rolls, roll driving mechanism including a friction transmitting wheel connected to rotate the take-up roll, an oscillatory and shiftable carrier, a friction drive disk connected to and partaking of the movement of said carrier, and a spring combined with said carrier for normally holding said drive disk in contact with the transmitting wheel.

14. In a music roll holder, the combination of music and take-up rolls, supporting means for said rolls, roll driving mechanism including a friction transmitting wheel connected to rotate the take-up roll, a friction drive disk, an oscillatory and longitudinally shiftable carrier by which said disk is supported, and a flexible shaft combined with said disk.

15. In a music roll holder, the combination of music and take-up rolls, supporting means for said rolls, roll driving mechanism consisting of a friction transmitting wheel connected to rotate the take-up roll, a frictional drive disk, a controller lever, a connection between said lever and said drive disk for oscillating the latter, and connections between said lever and said disk for shifting the same out of engagement with the transmitting wheel.

16. In a music roll holder, the combination of music and take-up rolls, supporting means for said rolls, roll driving mechanism including the friction transmitting wheel connected to rotate the take-up rolls, a carrier, a friction drive disk supported thereby, a controller lever, a link connecting said lever with said carrier for oscillating the same, and connections including a rock arm between said controller lever and carrier for shifting the same to move the drive disk out of engagement with the transmitting wheel.

17. In a music roll holder, a shaft, means for driving said shaft, a take-up roll loose on said shaft, a clutch connecting said roll to said shaft, a movable cradle, a contact roll carried thereby, and means made operative by movement of said cradle to disconnect the clutch members and thereby release the connection of the roll with the shaft.

18. In a music roll holder, a shaft, means for driving said shaft, a take-up roll arranged on said shaft and rotatable independently thereof, a clutch for connecting said roll to said shaft, the members of which are normally in engagement, a movable cradle, a contact roll carried thereby, and a bolt associated with said cradle and operating when the cradle is moved to take the contact roll out of operative position to unclutch the roll from the shaft.

19. In a music roll holder, a shaft, means for driving said shaft, a take-up roll mounted on said shaft and rotatable independently thereof, a clutch for connecting said roll to said shaft, a spring normally holding the members of the clutch in engagement, a movable cradle, a contact roll carried thereby, and a bolt associated with said cradle and adapted to release the clutch when the cradle is moved to take the contact roll out of operative position.

20. In a music roll holder, contact fingers and a contact roll adapted to operate therewith, a movable cradle in which the roll is mounted, means for moving said cradle to bring the contact roll into and out of operative position, and a guard carried by said cradle in position to protect the contact fingers when the contact roll is moved away from the fingers.

21. In a music roll holder, a shaft, means for driving said shaft, a take-up roll mounted on said shaft, a clutch for connecting said roll to said shaft, contact fingers, a contact roll to coöperate therewith, a movable cradle in which the contact roll is mounted, contact plates 81, a single lever arranged to engage said contact plates, and connected to said cradle, whereby said single lever controls the movement of the contact roll, and the operation of the clutch, and opens or bridges the contact plates.

22. In a music roll holder, the combination with music and take-up rolls, of a shaft on which the take-up roll is loosely arranged, means for driving said shaft, means for clutching said roll to said shaft, a music roll brake, contact-plates, a series of contact fingers, a contact roll coöperating therewith, a movable cradle in which said contact roll is carried, and a single lever and connections adapted to move said cradle, clutch and brake and arranged alternately to open or bridge the contact plates.

23. In combination with a slide, a music roll holder pivoted thereto, and means for maintaining the roll holder in line with the slide.

24. The combination with a slide, a music roll holder pivoted thereto, and a catch carried by one of said parts and engaging the other of said parts for maintaining the roll holder in line with the slide.

In testimony whereof I have hereunto set my hand in presence of two subscribing witnesses.

IRVING B. SMITH.

Witnesses:
F. W. ECKELMEYER,
GEO. Z. SUTTON.

Copies of this patent may be obtained for five cents each, by addressing the "Commissioner of Patents. Washington, D. C."